July 22, 1924.
A. KURTIS
BUMPER OPERATED BRAKE AND CLUTCH MECHANISM
Filed Jan. 15, 1924      5 Sheets-Sheet 5
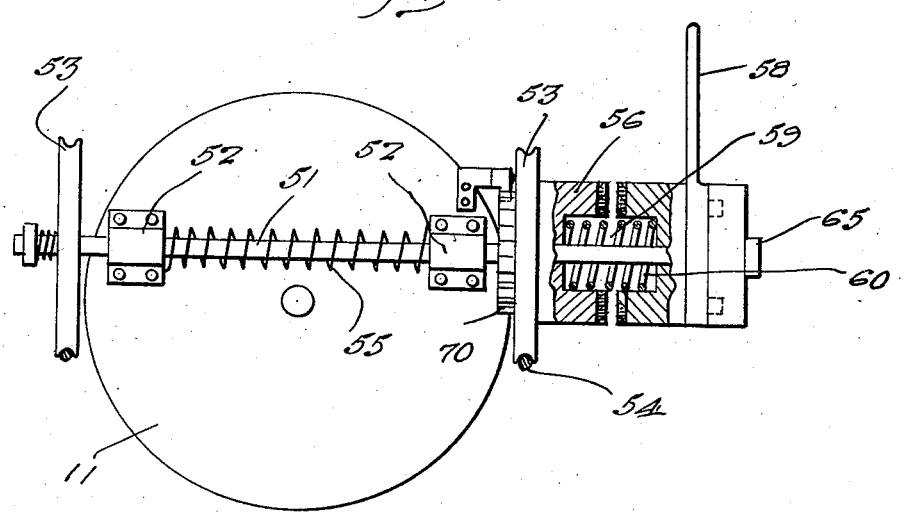
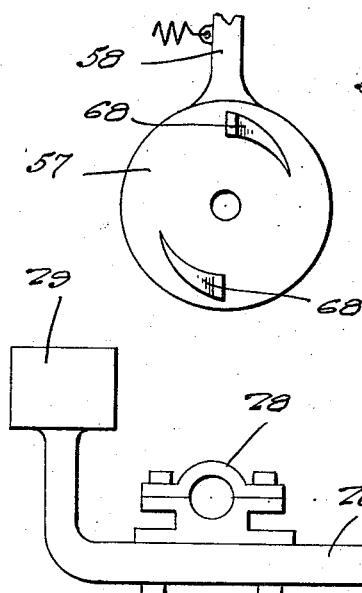
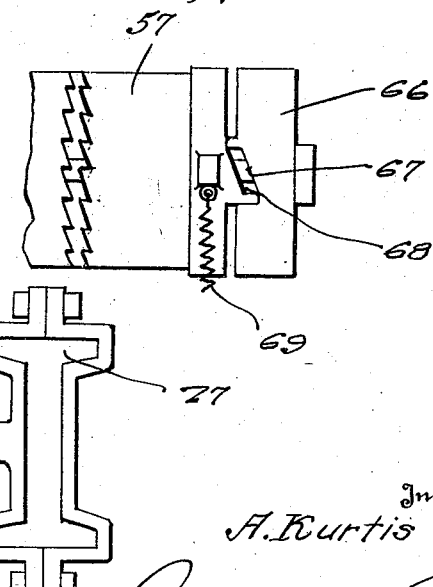
Inventor
A. Kurtis Patented July 22, 1924.

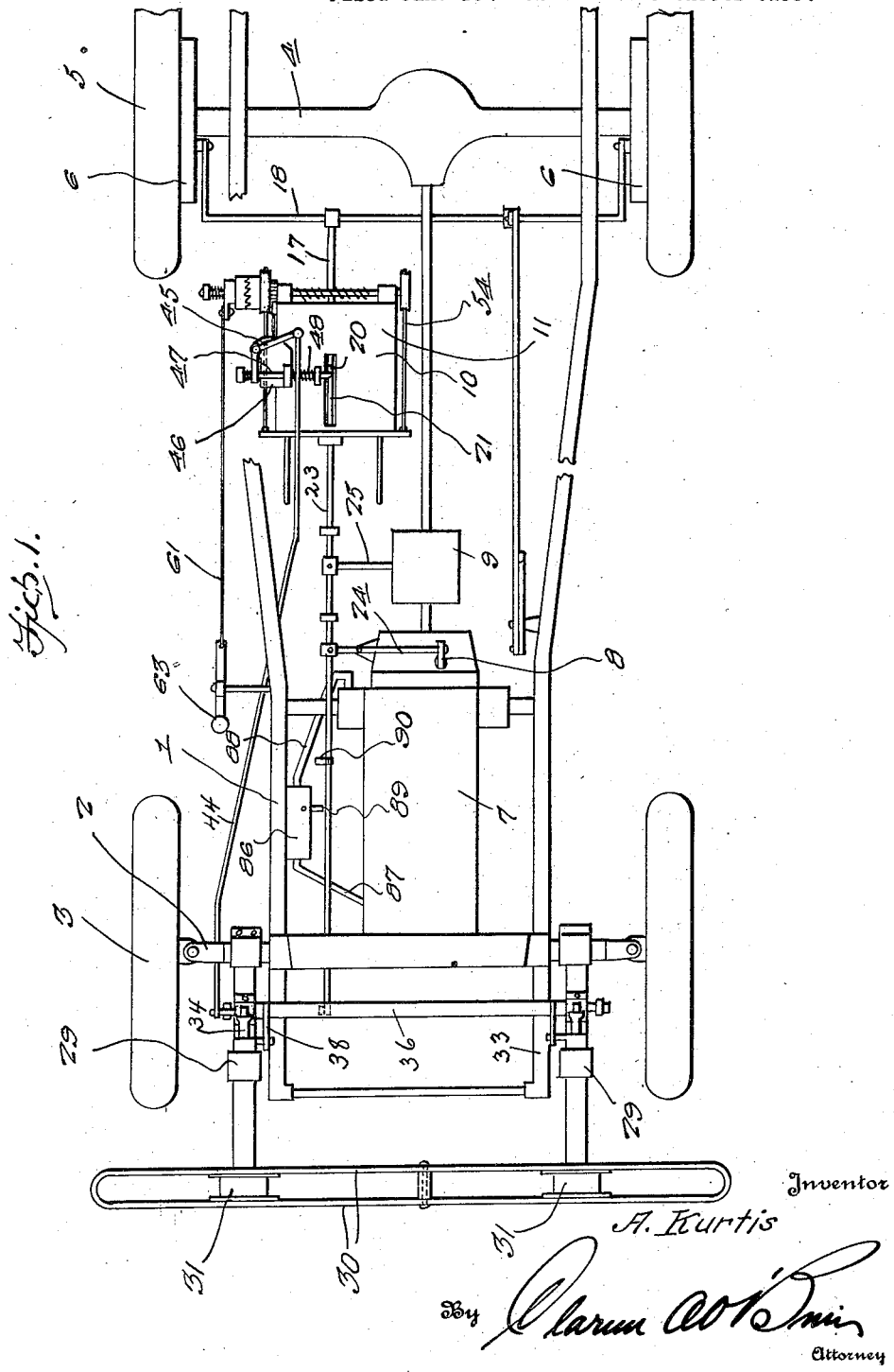

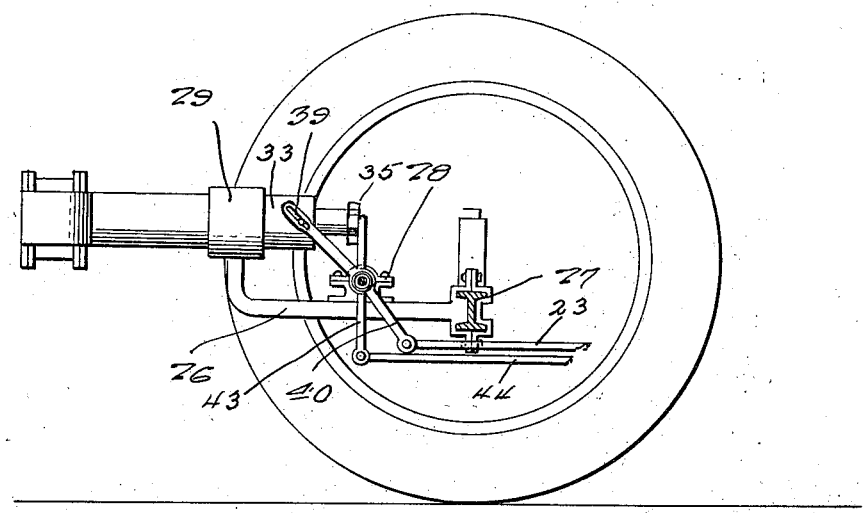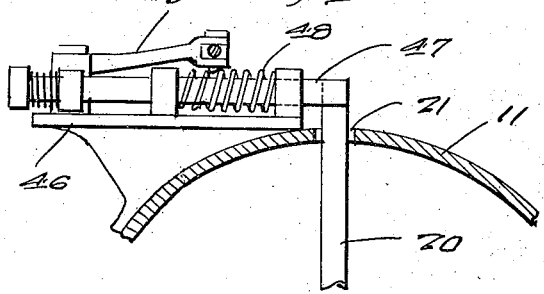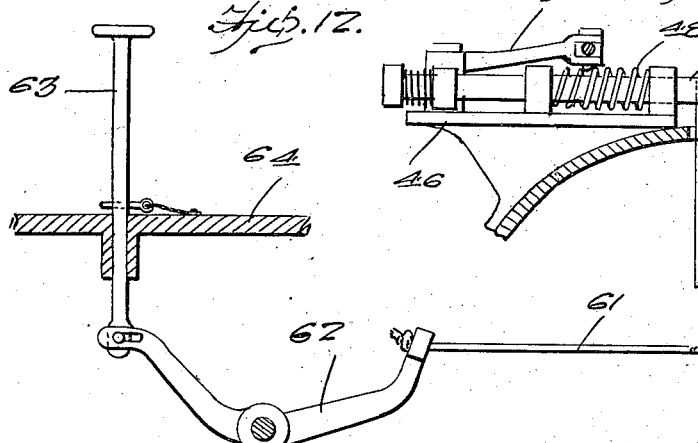

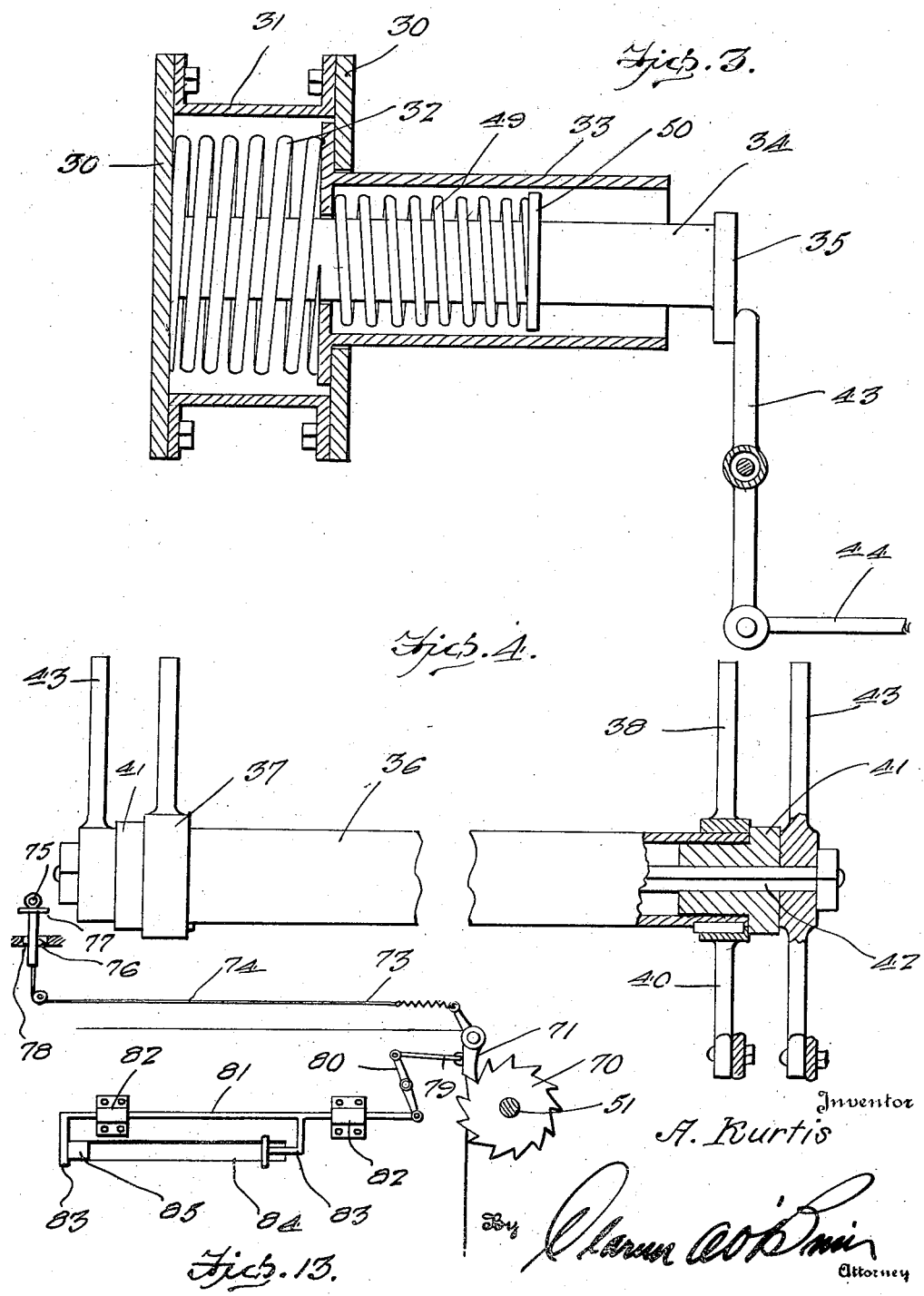

1,502,145

UNITED STATES PATENT OFFICE.

ANGELOS KURTIS, OF JACKSONVILLE, FLORIDA.

BUMPER-OPERATED BRAKE AND CLUTCH MECHANISM.

Application filed January 15, 1924. Serial No. 686,352.

*To all whom it may concern:*

Be it known that I, ANGELOS KURTIS, citizen of the United States, residing at Jacksonville, in the county of Duval and State of Florida, have invented certain new and useful Improvements in Bumper-Operated Brake and Clutch Mechanisms, of which the following is a specification.

This invention relates to improvements in devices for operating the brake, disengaging the clutch, and throwing the transmission into neutral position upon engagement of the bumper of the vehicle with an obstruction.

An object of the invention is to provide operating mechanism mounted on the frame of a motor vehicle and provided with connection to the clutch pedal, transmission operating mechanism, at the brake, with means operated by a bumper mounted on the forward end of the vehicle for controlling the operation of said mechanism and adapted to permit the operation thereof through the engagement of the bumper with an object or obstruction.

Another object of the invention is the provision of a latch controlled operating mechanism for the clutch pedal, the transmission and the brake, adapted when released for throwing the clutch, and the transmission into neutral position and for applying the brakes, wherein the latch of said mechanism is operated through connections with the bumper when an obstruction or object is engaged thereby.

A further object of the invention resides in providing an operating mechanism for the clutch, the transmission and the brake, and a bumper mounted for rearward sliding movement at the forward end of the vehicle in engaging an obstruction or object for having connection with the operating mechanism for setting said mechanism into operation upon the rearward movement of said bumper, connections being also provided between the operating mechanism and the bumper for returning said bumper to its normal projected position as the operating mechanism completes its cycle of movement.

More specifically the invention includes a spring operated mechanism having the spring normally held under tension by a latch mechanism connected for operation with the bumper for releasing said mechanism for permitting the spring to operate and through connections with the clutch pedal, the transmission and the brake operate said elements for moving the clutch pedal and transmission into neutral positions and applying the brake, additional means being provided for re-tensioning the spring and re-setting the latch mechanism together with the bumper.

The invention includes further objects and improvements in the specific details of construction and arrangement of parts which are more particularly pointed out in their details in the following description and claims illustrating the preferred form of the invention and it is to be understood that slight variation in the construction and arrangement of these parts may be made without departing from the spirit and scope of the invention.

In the drawings, Figure 1 is a plan view showing the assembly of a motor vehicle frame structure having the invention incorporated therewith.

Figure 2 is a side elevation of a portion of the front axle assembly showing the manner of mounting the bumper and connected parts thereto.

Figure 3 is a detail sectional view of one of the bumper mounting elements showing how the parts are adapted for relative movement for operating a pair of levers which control the spring mechanism.

Figure 4 is a detail view, partly in section of a lever and shaft mechanism for reversing the movement of the operating rod.

Figure 7 is a detail side elevation of one of the brackets for mounting the bumper and associated mechanism on the front axle.

Figure 8 is a detail view of the rear end of the operating spring housing, showing the clutch mechanism for operation to re-tension the spring.

Figure 9 is a detail view of the clutch members illustrating the manner of producing a relative movement of one member toward the other for engaging the clutch teeth of the members.

Figure 10 is a detail view of one of the clutch members taken at right angles to the showing in Figure 9.

Figure 11 is a detail view, showing the manner in which the bumper operated latch cooperates with the operating spring mechanism for holding said spring in tensioned relation prior to operation.

Figure 12 is a detail view of the foot operated lever and associated connections for operating the clutch mechanism of Figure 8.

Figure 13 is a detail of the pawl and ratchet mechanism cooperating with the clutch mechanism during the setting of the spring member and also for limiting the operation thereof.

Figure 5:
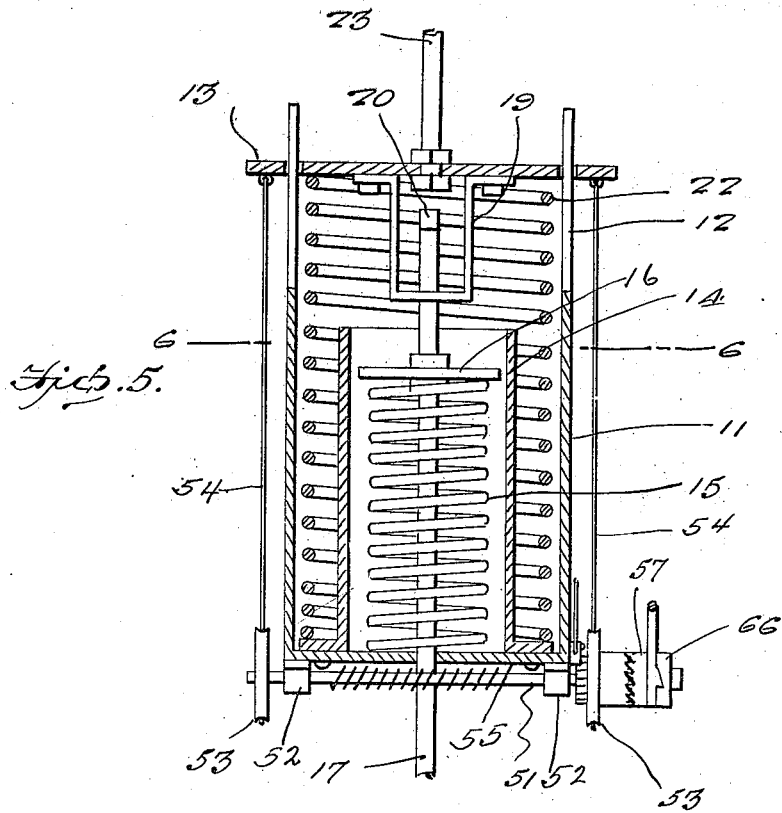
Figure 5 is a detail section view through the spring operated mechanism for the clutch, the transmission and the brakes.
Figure 6:
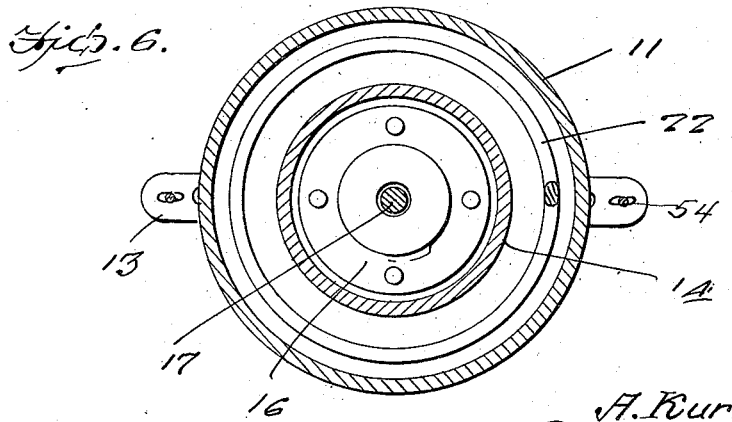
Figure 6 is a sectional view taken on the line 6—6 of Figure 5.

1 indicates the frame of the vehicle having a front axle 2 mounting the front wheel 3, the rear axle 4 mounting rear wheels 5 having the usual form of brake mechanism carried thereby as generally indicated at 6, and a motor assembly 7 including a clutch operated by the pedal 8 and a transmission mechanism generally indicated at 9 for transmitting the power from said motor assembly to the rear axle, all of which structure is of any desirable form as now used in the construction of motor vehicles.

Mounted at the rear portion of the frame and to one side thereof is an operating mechanism generally indicated at 10, which includes a spring housing 11 closed at one end and having guide projections 12 from diametrically opposite points at the other end for slidably receiving a plate member 13 in a manner clearly shown in Figure 5. A supplemental spring housing 14 is secured to the closed end of the housing 11 and mounted within said housing in concentric relation for receiving a coiled spring 15 interposed between the closed end of the housing and a plate 16 mounted on a brake operating rod 17 extending axially through the housing having bearings in the rear wall thereof and connected to the operating member 18 for operating the brake in the assembly 6 of each rear wheel, the spring 15 normally acting to effect this operation. The end portion of the brake operating rod 17 extends through an opening in the U-shaped bracket 19 mounted on the inside of the slide plate 13 and is formed with a lateral end portion 20 extending through a slot 21 in the top portion of the casing 11, the purpose of which will be presently described. An expansible coil spring 22 is positioned over the inner spring casing 14 and within the housing 11 and normally engages the inner face of the plate 13 for forcing it outwardly relative to the end of the casing.

A shaft 23 is mounted in the central portion of the slidable plate 13 and extends forwardly therefrom to a point beyond the front axle for connecting with a bumper assembly in a manner to be described. This shaft 23 is also provided with a lever connection 24 for operating the clutch member 8 to disengage the same under predetermined conditions and a connection 25 with the transmission 9 so that the operation of the shaft will also operate the transmission mechanism under predetermined conditions for shifting said mechanism to neutral position, thereby throwing the power unit out of operative connection with the rear wheels.

The bumper assembly includes a pair of bracket members 26 formed for mounting on the front axle of the vehicle as indicated at 27 provided at 28 with aligned bearings for the reception of the shaft structure shown in Figure 4 and with bearings 29 extending forwardly of the bearings 28 and arranged in parallel relation for slidably mounting the bumper assembly therein. The bumper includes a pair of spaced interconnected parallel bars 30 having casings 31 secured between said bars in line with the bearings 29 and forming housings for the springs 32 mounted between the bars 30, the rear ends engaging flanges on the ends of slide tubes 33 extending through the bearings 29 and mounting the bumper in the brackets 26 secured to the front axle. A pair of rods 34 are secured at one end to the forward bar 30 as clearly shown in Figure 3 and extends rearwardly through the slide tubes 33 and beyond the rear ends of said tubes where they are provided with lever engaging terminals 35.

The direction reversing lever assembly includes a tubular shaft member 36 rotatably mounted in the bearings 28 and having collars 37 mounted thereon provided with lever extensions 38 provided with a pin and slot connection 39 with the inner end of the slide tube 33, one of said collars being provided with a depending lever 40 pivotally connected at its lower end with the forward end of the shaft 23. This connection provides for the sliding of the tubes 33 in the bearings during the operation of the mechanism 10 for retracting the bumper from the obstructions or objects with which it engages for producing the operation of said mechanism 10, and which serves to return or project the bumper bars 30 at a distance substantially in front of the forward wheels 3 adapted for its subsequent operation upon engagement with an object or obstruction. A pair of bearing blocks 41 are rotatable in the ends of the tubular shaft 36 and receive a squared shaft 42 for rotation therewith extending beyond the tubular shaft 36 and the ends of the bearing blocks 41 for receiving the central portion of levers 43, the upper ends of which are adapted to bear against the ends of portions 35 for receiving motion imparted thereto by the forward bar 30 for transmission in a reverse direction to the operating rod 44 connected at its rear end with a bell crank lever 45, pivotally mounted on the plate 46 carried by the housing 11, and having the other end provided with a cushioned connection with a latch 47 adapted for engagement with the projecting ends 20 on the brake operating rod for holding the springs 15 and 22 under tension preparatory for operation. This latch 47 is normally forced into the path of movement of the projection 20 by the spring 48 engaging against a collar mounted on the latch and a bearing carried by the plate 46 for the latch which normally holds the latch member in projected position. A bearing spring 49 normally under tension is mounted between a collar 50 on each rod 34 and an inwardly extending flange on the forward edge of the slide tube 33 for normally tending to force the rods 34 rearwardly relative to the tube 33.

The resetting mechanism for the plates 13 and the springs 15 and 22 include the shaft 51 mounted in bearings 52 on the rear end of the housing 11 provided adjacent the sides of the casing with grooved wheels 53 having cable connections 54 for winding movement thereon with the slide plates 13 arranged so that the rotary movement of the shaft and the grooved wheels may be effected for retracting the plate 13 against the end of the housing and resetting the springs 15 and 22. The coil spring 55 is mounted on the shaft 51 between the bearings and has one end connected with said shaft and the other end connected with the end wall of the housing 11 for normally acting to rotate the shaft in one direction in order to maintain a tension on the cable 54. One end of the shaft projects substantially beyond one of the wheels 53 for receiving a clutch mechanism including a clutch collar 56 mounted on the shaft and against the wheel 53 adapted for rotation with the shaft and provided on its outer face for clutch teeth for cooperation with corresponding clutch teeth on the movable collar 57 mounted for relative rotation and axial movement on the shaft through the operation of the lever extension 58 thereon.
Each of the clutch members 56 and 57 are provided with recessed portions 59 communicating at the adjacent faces for the reception of a spring member 60 adapted to normally force said clutch members apart for dis-engaging the cooperating clutch teeth. A connection 61 is provided between the free ends of the lever 58 and one end of the bell crank lever 62 clearly shown in Figure 12 with the lower end of a foot operated lever 63 extending through the floor board indicated at 64 of the vehicle, so that the foot lever 63 is in close proximity with the position occupied by the driver of the vehicle for convenient operation. The end of the shaft 51 extending beyond the clutch member is provided with a stop 65 formed or otherwise secured on said shaft adapted to engage and hold a collar 66 against disengagement from the shaft and axial movement thereon. The collar 66 is provided with cam faces 67 cooperating with cam faces 68 on the abutting ends of the movable clutch collar 57 so that in the rotation of the clutch member 57 through the operation of the foot member, the said clutch member 57 will be forced into engagement with the clutch member 56 mounted on the shaft for effecting a rotation thereof in a direction adapted to retract a slide plate 13 through the cable connection 54. A spring 69 is attached to the lever 58 for normally holding the parts in the position shown in Figures 9 and 12 with the clutch member 57 disengaged from its cooperating member.

If one operation of the foot pedal 63 is not sufficient to entirely reset the slide plate 13 in its normal position with the projection behind the lug member 47, it is necessary to provide a pawl and ratchet mechanism for cooperation with the clutch mechanism in the resetting operation. This includes a ratchet member 70 mounted on the shaft 51 adjacent one of the groove wheels 53 as clearly shown in Figure 8 of the drawing, having a pawl 71 pivotally mounted on the rear end of the casing 11 for operating with the ratchet teeth of said ratchet for holding the spring members in the casing 11 under tension at various steps in the setting thereof, before the projection 20 engages with the latch member 47. A projection 72 from said pawl is connected with one end of a coil spring 73, the other end of which is connected with an operating cable 74 extended forwardly to a position within reach of the driver, where it is connected with an operating handle 75 provided with a projection 76 spaced from the annular plate 77 for cooperation with a plate 78 in a manner to provide a tension on the spring when the projection 76 is engaged with the plate 78 for holding the pawl in engagement with the ratchet and when the annular plate 77 is engaged with the plate 78 the tension of the spring on the pawl will be relieved for a purpose to be presently described. A link 79 connects the pawl with a lever 80 pivoted to one side of the casing 11 intermediate its ends which also has a connection 81 in the form of a slide bar mounted in bearings 82 in the casing 11, which slide bar is provided with projections 83 at the forward and rear ends of the slot 84 in the side portion of the casing 11, through which projects an extension 85 from the brake operating rod 17 for cooperation with the projections 83 for disengaging the pawl from the ratchet when the projection 20 is secured in such position by the latch member 47. After the release of the projection 20 and the operation of the spring in the casing 11, the projection 85 moves forwardly and when it reaches its limit of movement it engages the forward extension 83 on the slide bar 81 and engages the pawl 71 with the ratchet for limiting the movement of the plate 13 and the expansion of the springs contained in the casing 11. The structure above described for tensioning the spring 73 is adapted for use in connection with the function of the bar 81 so as to relieve the tension of the spring after the setting of the spring within the casing 11 so that the slide bar independently controls the operation of the pawl 71. During the resetting of the spring and the slide plate, the operator of the automobile operates the handle 75 for tensioning the spring 73 and folding the pawl 71 in engagement with the ratchet, for preventing a return movement of the spring and plate 13 after each operation of the foot lever 63 so that the resetting of the springs 15 and 22 in the housing 11 may be effectively and quickly performed.

When applied to an automobile in use, it will be observed that in the forward movement of the vehicle, the various parts of the mechanism being set as indicated in Figure 1, that the springs 15 and 22 tensioned and held by the latch member 47 with the bumper bars 30 projecting substantially forwardly of the vehicle, the impact to the bars 30 with an obstruction or object will force the same rearwardly producing a relative movement between the bars which is absorbed by the springs 32 for initially operating the lever 43 and connections 44 with the latch mechanism for disengaging the latch 47 from the projections 20 to permit the operation of the springs within the housings 11. Immediately following this movement, the tubes 33 will be slid rearwardly in the bearings 29 from the impact for assisting the initial operation of the shaft 23 which is extended forwardly under the action of the spring 22 for operating the clutch and transmission mechanism to position the same in neutral for disengaging the driving connection between the power element and the rear wheel. Simultaneously with the action of the spring 22, the spring 15 will project the brake operating rod 17 forwardly for operating the brake mechanism 6 in each of the rear wheels for applying the brakes and stopping the movement of the vehicle. During the operation of the shaft 23 in its forward movement, the bumper 3 will be retracted or moved rearwardly in the bearings 29 though the connections between the pendant lever 40 and the shaft for preventing further engagement of the bumper with the objects and to assist in preventing damage to the bumper bars 30. During this operation, the pawl 71 is disengaged from the ratchet 70 until the plate 13 reaches its forward limit of movement in the projection 85 for engaging the arm 83 for moving the pawl into engagement with the ratchet.

Before the vehicle can be restarted, it is necessary to reset the operating spring mechanism 10 having the springs 15 and 22 contained within the casing 11, at the bumper assembly mounted upon the front axle. This is effected by operating the hand lever 75 to engage the projection 76 with the plate 78 and placing a tension on the spring 73 for engaging the pawl 71 with the ratchet, following which a series of successive operations of the foot lever 63 will cause cooperation between the clutch members 56 and 57 and produce a rotation of the shaft 61 for retracting the plate member through the cable connection 54 until the projection 20 engages behind the latch member 47. During this retracting operation of the plate 13 and the spring members within the casing 11, the shaft 33 operates the lever 40 for rotating the tube 36 and through the lever connections 38 with the slide tubes 33 repositions the upper bar 30 forwardly of the vehicle in a position adapted for a subsequent cycle of operation for applying the brakes as above described.

From the above description it will be noted that a simple and efficient bumper controlled mechanism is provided for setting the brakes of the vehicle and disengaging the power elements from driving connection with the rear wheels upon engagement of the bumper with an object or obstruction in the roadway.

What I claim as new is:

1. A device of the class described including an operating mechanism, connections between said mechanism and the drive connection between the power unit and the rear axle of the vehicle and a brake operating mechanism for disconnecting the drive connections and applying the brakes when the mechanism is released for operation, releasable means for holding the operating mechanism set for operation, and bumper controlled means for releasing the last mentioned means having a pair of brackets mounted on the front axle of the vehicle formed with spaced parallel bearings, a pair of spaced parallel bumper bars connected at the end portions extending transversely of the vehicle and forwardly thereof, the forward bar having rod projections in line with the bearings of the brackets, the rear bar having sleeves slidably mounted therein and in the bearings and extending around the rod projections, the resilient means between the sleeves and the front bar for permitting relative movement between the sleeves and the front bar for permitting a relative movement between the sleeves and the rods when the bumper engages an object, connections between the rods and the releasable means adapted to operate said means in the operation of the rod to release said operating means, and connections between said sleeves and the operating means whereby the operation of said mechanism will retract the bumper from the object during the operation thereof and will project the bumper to its forward position in the resetting thereof.

2. A device of the class described, including an operating mechanism, connections between said mechanisms, and drive connections between the power unit and the rear axle of the vehicle, and a brake operating mechanism for disconnecting the drive connections and applying the brakes when the mechanism is released for operation, releasable means for holding the operating mechanism set for operation, and bumper controlled means for releasing the last mentioned means having a pair of brackets mounted on the front axle of the vehicle formed with spaced parallel bearings, a pair of spaced parallel bumper bars connected at the end portions and extending transversely of the vehicle, the forward bar having rod projections in line with the bearings of the brackets, the rear bar having sleeves slidably mounted therein and in the bearings and extending around the rods projections for slidably mounting the bumper in the bearing, resilient means between the sleeves and the front bars for permitting a relative movement between the sleeves and the rods, a pair of relatively rotatable shafts mounted in bearings on said brackets, one shaft having levers mounted thereon provided for engagement at one end with the rod carried by the forward bumper bars, and connections at the other end with said releasable means adapted in the rearward movement of said rod to release said means and permit the operation of the operating mechanism, levers mounted on the other shaft having connection at one end for cooperation with said sleeves in the movement thereof in the bearings, and a shaft connection at the other end with said operating mechanism whereby the operating mechanism will slide the sleeves rearwardly through said bearings and retract the bumper bars from the objects engaged thereby and in the resetting of said operating mechanism the bumpers will be again projected to the forward position relative to said bearing.

3. A device of the class described including an operating mechanism for the drive connections between the power unit and the rear axle, and a brake operating mechanism for disconnecting said drive connection and applying the brakes in the operation thereof, said mechanism including a housing provided with guides, a slide plate mounted for movement on the guides, connections between the slide plate and the drive controlling connections, a brake operating shaft slidably mounted in the housing, means in the housing for moving the slide plate and the brake operating shaft for effectively operating the respective parts connected therewith, means for setting said first mentioned means preparatory for an operation, releasable means for holding said first mentioned means in set position, and means for operating the releasable means for permitting the operation of the first mentioned means.

4. A device of the class described including an operating mechanism for the drive connections between the power unit and the rear axle, and a brake operating mechanism for disconnecting said drive connections and applying the brakes in the operation thereof, said mechanism including a housing provided with guides, a slide plate mounted for movement on said guides, connections between the slide plate and the drive controlling connections, a brake operating shaft slidably mounted in the housing, independent means for operating the slide plate and the brake operating shaft, means for setting said independent means preparatory to an operation, releasable means for securing said independent means in such position, and means for operating said releasable means to permit the operation of the independent means.

5. A device of the class described including an operating mechanism for the drive connections between the power unit and the rear axle, and a brake operating mechanism for disconnecting said drive connections and applying the brakes in the operation thereof, said mechanism including a housing provided with guides, a slide plate mounted for movement on the guides, connections between the slide plate and the drive controlling connection, a brake operating shaft slidably mounted in the housing, resilient means mounted in said housing and connected with the brake operating shaft and the slide plate for normally operating said members to disconnect the drive and apply the brake, setting means for placing the resilient means under tension in position for operation, releasable means for holding said resilient means in set position, and means for operating said releasable means to permit the operation of the resilient means.

6. A device of the class described including an operating mechanism for the drive connections between the power unit and the rear axle, and a brake operating mechanism for disconnecting said drive connections and applying the brakes in the operation thereof, said mechanism including a housing provided with guides, a slide plate mounted for movement on the guides, connections between the slide plate and the drive controlling connections, a brake operating shaft slidably mounted in housing, independent spring members mounted in the housing for operating the slide plate and the brake operating shaft independently of each other, a setting mechanism adapted for setting said spring members preparatory to an operation, releasable means for holding said spring members in set position, and means for operating said releasable means to permit the operation of the spring member.

7. A device of the class described including an operating mechanism for the drive connections between the power unit and the rear axle, and a brake operating mechanism for disconnecting the drive connections and applying the brakes in the operation thereof, said mechanism including a housing provided with guides, a slide plate mounted for movement on the guides, connections between the slide plate and the drive controlling connections, a brake operating shaft slidably mounted in the housing, resilient means mounted in the housing for operating said slide plate and brake operated shaft, a setting mechanism for tensioning said resilient means preparatory to an operation thereof having a shaft rotatably mounted on said housing, connections between the shafts and the slide plates for moving said slide plates toward the housing in the rotation of the shaft for placing said springs under tension, dis-engageable clutch members mounted on said shafts, manually operated means for rotating one of said clutch members for cooperative relation with the other clutch member to rotate said shaft and set a resilient means under tension, latching means adapted for holding said resilient means in set position, and operating means for said latching means adapted to disengage the same from said resilient means to permit the operation thereof.

8. A device of the class described including an operating mechanism for the drive connections between the power unit and the rear axle and the brake operating mechanism for disconnecting said drive connections and applying the brakes in the uprights thereof, said mechanism including a housing provided with guides, a slide plate mounted for movement on the guides relative to said housing, connections between the slide plate and the drive controlling connections, a brake operating shaft slidably mounted in the housing, resilient means mounted in the housing for operating the brake operating shaft and the slide plate, a setting mechanism for said resilient means having a shaft rotatably mounted on the rear end of the housing, cable connections between said shaft and said slide plate adapted in the rotation of the shaft to wind said cables thereon for moving the slide plate toward the housing for tensioning said resilient means, a pair of cooperating clutch members mounted on said shaft, one of said members being adapted for rotation relative thereto, means for normally disengaging said members from cooperative connection, manually operable means for actuating said movable clutch member for cooperation with the other clutch member mounted on the shaft adapted for rotating the shaft in step by step movement, a pawl and ratchet mechanism mounted on said shaft and cooperating with said cooperating clutch members for preventing rotation of the shaft in one direction during the operation of the setting mechanism for placing said resilient means under tension, a latch member adapted for cooperation with the resilient means to hold it in set position, and means for releasing the said latch member to permit the operation of the resilient means.

In testimony whereof I affix my signature.

ANGELOS KURTIS.